April 4, 1961 H. ALLEN 2,977,975
VALVE
Filed May 6, 1957 9 Sheets-Sheet 2

Herbert Allen
INVENTOR.
BY
ATTORNEYS

April 4, 1961 H. ALLEN 2,977,975
VALVE
Filed May 6, 1957 9 Sheets-Sheet 9

Herbert Allen
INVENTOR.

BY
Browning, Simmons & Hyer
ATTORNEYS

United States Patent Office 2,977,975
Patented Apr. 4, 1961

2,977,975

VALVE

Herbert Allen, Houston, Tex., assignor to Cameron Iron Works, Inc., Houston, Tex.

Filed May 6, 1957, Ser. No. 659,199

47 Claims. (Cl. 137—330)

This invention relates broadly to valves. In one of its aspects, it relates to valves having seating surfaces with improved wear characteristics. In another of its aspects, this invention relates to a valve having a novel assembly for locating a replaceable seat element between seating surfaces on the valve member and valve body. In still another of its aspects, this invention relates to a gate valve having a gate and replaceable seat element assembly especially well adapted for use in lubricated, conduit-type gate valves.

This application is a continuation-in-part of my co-pending application, Serial No. 651,748, filed April 9, 1957, and entitled "Valve," and now abandoned.

When the flowway through a gate valve is choked during its final closing and initial opening movement, fluid flowing therethrough at an increased velocity impinges upon the surface of the valve body against which the downstream side of the gate seats. As a result, this seating surface is worn about the lower portion of its edge which surrounds the flowway. Similarly, the seating surface of the body of a rotary plug type valve is caused to wear about a side portion of its edge which surrounds the flowway therethrough. In both cases, the worn seating surfaces eventually permit leakage across the closed valve member.

In the case of a valve of the type having the inlet and outlet portions of its flowway disposed angularly with respect to one another, the flow of fluid from the inlet impinges upon the portion of the edge of the seating surface of the valve body which surrounds the outlet portion of the flowway and is furthest from said inlet, so that wear on said surface is heaviest along this portion. Although the degree of wear in this latter instance normally will not be as great as that encountered due to choking of the flowway through gate and rotary plug type valves, it also presents a serious maintenance problem, so that even when separate and removable seat elements are provided, they must be replaced often.

An object of this invention is to provide a valve in which this wear upon the seating surface of the valve body may be distributed about its edge.

A more particular object is to provide a valve in which such wear is distributed about the edge of its seating surface automatically in response to operation of the valve member.

It is conventional to carry replaceable seat elements within a counter-bored portion of the body of a gate or rotary plug type valve which surrounds the flowway adjacent a side of the valve member in its closed position. However, these counter-bored portions not only require expensive machine work, but also produce irregular stress patterns which include several points of high stress concentration. In many cases, localized yielding takes place under stresses developed by the first application of test pressure and destroys the perfect alignment machined into the valve body.

It has been proposed to eliminate such counterbored portions by carrying the seat elements within replaceable assemblies located in the valve body at opposite sides of the gate. For example, see the gate valve of Volpin Patent No. 2,705,019 wherein such an assembly is properly located within the body by means of a hinged connection with the bonnet of the valve. These arrangements are, however, both complicated and particularly unadaptable for use in lubricated, conduit-type gate valves.

A further object is to provide a valve having such an assembly for locating a seat element merely upon connection of the bonnet of the valve to the body thereof.

A still further object is to provide a gate valve having such an assembly which, in addition to carrying the seat elements, forms substantially confined grease chambers above and below the gate.

Other objects, advantages and features of this invention will be apparent to one skilled in the art upon a consideration of the written specification, the attached claims and the annexed drawings.

The valve of the present invention includes a body having a flowway therethrough and a cavity therein intersecting the flowway. A valve member is mounted on the body for movement within the cavity between flowway opening and closing positions, and a seat element having an opening therethrough is carried within the body for engagement between the valve member in its closed position and a surface on the body which surrounds the flowway adjacent its intersection with one side of the cavity. In accordance with one novel aspect of the invention, a means is provided for rotating the seat element in a predetermined rotational sense about the axis of its opening, whereby the surface on such element which is most susceptible to wear may be changed from time to time. In accordance with a preferred embodiment of the invention, this means is responsive to each cycle of opening and closing movement of the valve member, such that this surface is automatically changed during normal operation of the valve.

When the flowway of a valve is closed or choked during the initial opening or final closing movement of the valve member, a pressure differential is established thereacross to force the seat element against a surface on body which surrounds the flowway adjacent its intersection with one side of the cavity. Although any number of suitable means for rotating the seat element are contemplated by this invention, the preferred embodiment thereof avails itself of the above characteristic by providing a carrier within the valve body cavity mounting the seat element in the manner previously described and parts on said carrier and valve member engageable with one another during opening and closing movements of the valve member, respectively, to rotate the carrier in opposite rotational directions about the axis of the opening through the seat element. More particularly, these parts are so arranged as to rotate the carrier in one of said directions during either the aforementioned initial opening or final closing movement of the valve member, and the carrier is provided with means frictionally engaging the seat element with sufficient force to rotate it with the carrier during rotation thereof in the other directions, but ineffective to overcome the force with which the seat element is held against the seating surface of the valve body during rotation of the carrier in said one directional sense. Thus, the carrier is rotated relative to the seat element mounted thereby during this cycle of carrier rotation such that, during each cycle of opening and closing movement of the valve member, the seat element will, as previously described, be rotated progressively in one directional sense.

The cavity within the valve body opens to one side thereof and is covered by a bonnet removably connected to the body and supporting the valve member for movement within the cavity between opened and closed positions. The carrier for the seat element is removable from the valve body cavity to permit replacement of the seat element upon removal of the bonnet. It is contemplated that, in the case of gate and rotary plug type valves, the carrier will be held between the bonnet and the bottom and sides of the cavity to locate the seat element in proper position between the valve member and body seating surface. It is also contemplated that this novel aspect of the present invention may be practiced either in connection with or apart from that above described.

According to a still further novel aspect of the invention, a gate valve of the conduit type having a gate with an opening therethrough adapted to be aligned and disaligned with the flowway for opening and closing the valve is provided with a carrier in the form of a plate which extends substantially coextensively of the cavity adjacent the gate to form a pair of substantially confined chambers above and below the gate which are connected by a groove for circulating grease from one chamber to the other during movement of the gate.

It will be understood that although the above apparatus has been described in connection with an assembly which includes a single carrier and a single seat element mounted thereby for engagement with the downstream side of the gate, it is contemplated that gate and rotary plug type valves will ordinarily be provided with two such carriers and seat elements, one on each side of the valve member, such that the valve will be adapted for flow in either direction therethrough.

In the drawings, wherein like reference characters are used throughout to designate like parts.

Figures 1, 1A, 2:
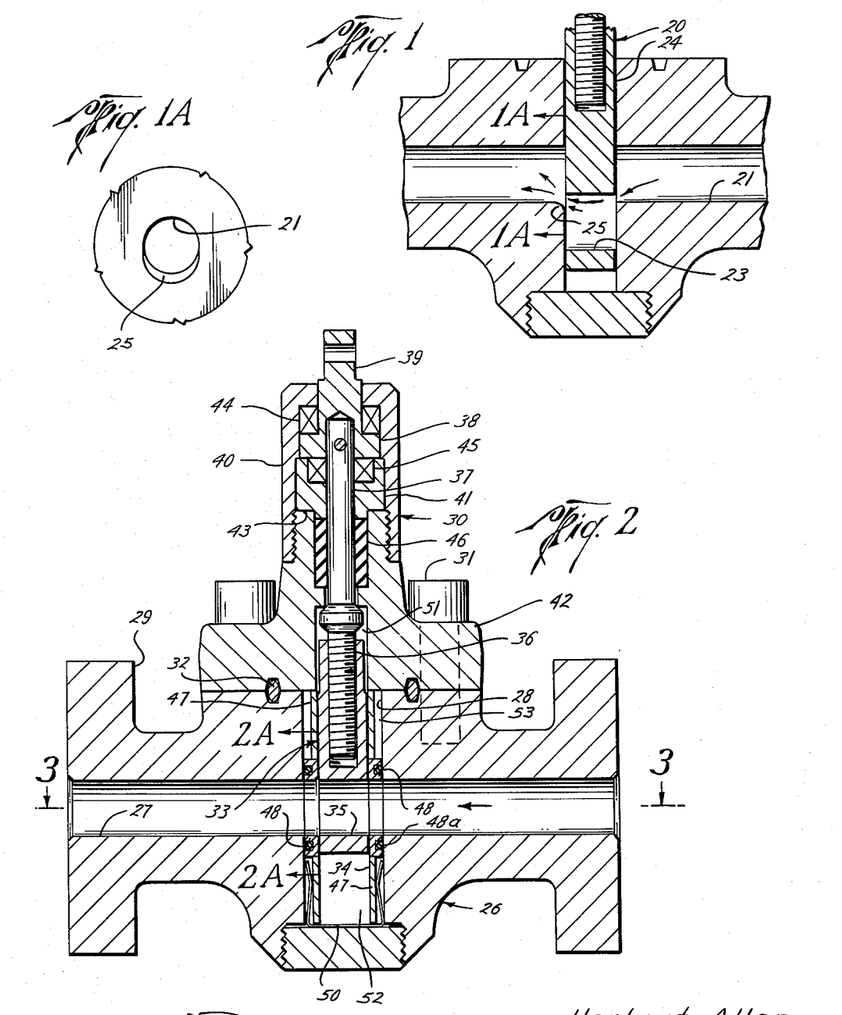
Fig. 1 is a vertical sectional view of a part of a conventional gate valve with the flowway therethrough choked by the gate, and illustrating by arrows the impingement of fluid at high velocity upon the downstream seating surface of the valve body.
Fig. 1A is a sectional view of the conventional gate valve of Fig. 1, taken substantially along the broken line 1A—1A, and illustrating the wear along the lower edge of this seating surface.
Fig. 2 is a vertical sectional view of one form of a gate valve constructed in accordance with the preferred embodiment of the present invention.

Referring now more particularly to the above described drawings, the gate 20 of the conventional valve illustrated in Figs. 1 and 1A is shown in a position during either its final closing or its initial opening movement so that the flow of fluid through the flowway 21 of the valve is choked by the opening 23 through the gate. Consequently, this fluid is flowing at a high velocity and, as shown by the arrows of Fig. 1, impinges upon the seating surface of the body which is disposed adjacent the downstream side of the cavity 24 in the body which forms a guideway for the gate. As shown at 25 in Figs. 1 and 1A, this impingement of fluid at high velocity will wear away the lower portion of the edge of this seating surface so that eventually there will be leakage past the gate when it is in the closed position. Even when a conventional gate valve is provided with separate seat elements for providing this seating surface, the concentrated wear requires their frequent replacement.

Figure 7:
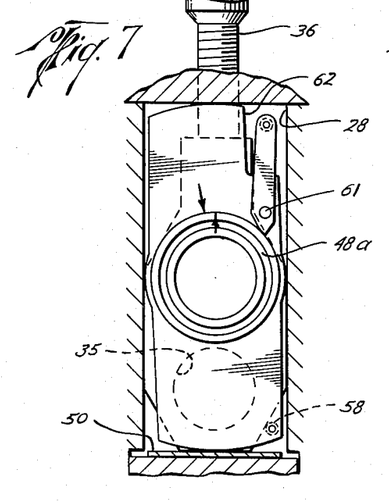
Fig. 7 is a further view of the gate and seat assembly similar to Figs. 5 and 6, and showing the gate in its fully closed position.
Figure 8:
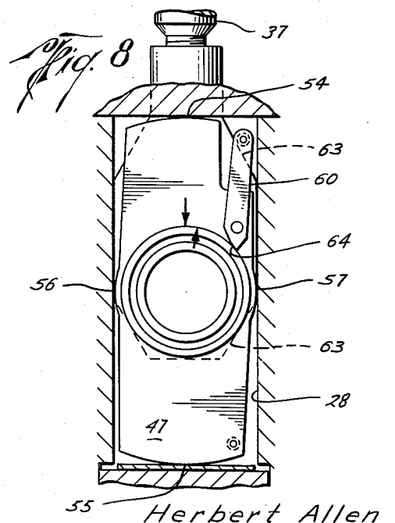
Fig. 8 is a still further view similar to Figs. 5 to 7, but showing the gate returned to its open position.
Figure 9:
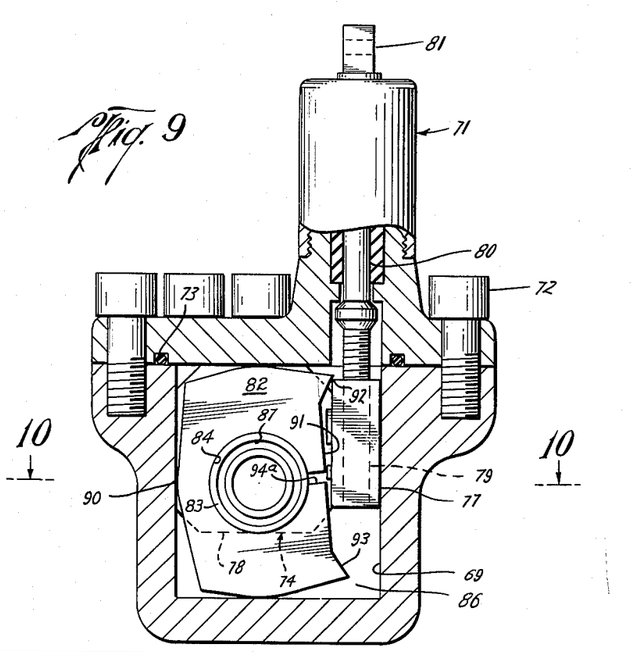
Fig. 9 is a vertical sectional view of another form of gate valve constructed in accordance with the preferred embodiment of the present invention, but taken at substantially right angles to the flowway therethrough.

The form of gate valve which is shown in assembly in Fig. 2 includes a body 26 having a flowway 27 therethrough and a cavity 28 therein intersecting the flowway. As is conventional in the art, the body 26 may be provided with parts, such as the flanges 29 at each end thereof, for connection in a pipeline. As can be seen from Fig. 2, the cavity 28 opens to one side of the valve body 26 and is covered by a bonnet 30 which is removably connected to the body by means of bolts 31. An annular ring 32 or other suitable means may be provided for sealing between the bonnet and valve body. As is customary, the bonnet supports a gate 33 for movement within a guideway 34 in the cavity between flowway opening and closing positions. For this purpose, the gate 33 is provided with an opening 35 therethrough which is alignable with the flowway 27 in its opened position, as shown in Fig. 2, and movable out of alignment therewith to close the flowway, as shown in Fig. 7.

As is shown in Fig. 2, the upper end of the gate 33 is connected to the lower threaded end 36 of a stem 37 which is pinned at its upper end to an extension 38 having a part 39 projecting outwardly from the top of the bonnet to permit rotation of the stem. As will be described below, the extension 39 is fixed within the bonnet against vertical movement so that as it is rotated, the gate 33 is caused to move vertically in the guideway 34. Thus, the extension 39 is supported upon a bushing 41 for the stem resting upon an internal shoulder 43 of a body portion 42 of the bonnet, and is held down by a cap 40 threaded over said body portion and surrounding the bushing. Suitable thrust bearings and seals 44 and 45 may be disposed about the extension 38 and stem 37, respectively, as shown in Fig. 2. Also, a packing 46 may be arranged about the stem 37 and confined between the bushing 41 and a restriction in the body portion 42 of the bonnet through which the stem 37 is received. Obviously, upon removal of the cap 40, the packing 46 may be replaced.

Turning now to the novel features of this gate valve, a pair of plates 47 are disposed within the cavity 28 of the valve body 26 transversely of the flowway and on both sides of the gate so as to define the guideway 34 therebetween. More particularly, an annular seat element 48 is received within a port 49 through each plate for disposal axially of the flowway 27. As previously noted, this arrangement eliminates the need for counter-bores in the body to receive the seat elements.

As best shown in Fig. 2, each seat element 48 is thicker than the plate 47 which carries same such when a pressure differential is established across the gate due to choking or closing of the flowway, the gate is forced against the downstream seat element. As a result, this seat element is held tightly between the portion of the cavity 28 which surrounds the flowway 27 and the downstream surface of the gate so as to prevent leakage past the gate. The outer surface of each seat element is provided with an annular groove 48a for carrying an O-ring or the like for sealing with the cavity.

A U-shaped spring clip 50 is received over the lower ends of the plates to maintain their inner surfaces inwardly adjacent the opposite sides of the gate. Moreover, the plates are substantially coextensive of the guideway 34 to divide it into grease chambers 51 and 52 above and below the gate and form spaces 53 annularly of the outer peripheries of the seat elements 48 between the outer surfaces of the plates 47 and the opposite sides of the cavity 28. As can be seen from Fig. 2, the sides of the spring 50 are received in the lower portion of the space 53.

Obviously, upon removal of the bonnet 30 from the valve body 26, the gate 33 and plates 47 may be removed from the cavity 28 of the valve body to permit replacement of the seat elements 48. Furthermore, as best shown in each of Figs. 5 to 8, the plates 47 are held between the bonnet and the bottom and opposite sides of the cavity 28 in the valve body for locating the seat element in the position above-described. More particularly, each of the top and bottom edges 54 and 55, respectively, as well as side edges 56 and 57 of each plate 47 engaged by the bonnet and cavity is curved concentrically of the port 49 therethrough so as to be rockable about the axis of the openings through the seat elements. As will be more fully understood hereinafter, these curved edge portions of the plate are connected by flat edge portions which are so disposed as to limit each rocking movement of the plates.

As previously mentioned, the plates 47 are provided with parts engageable by the gate during its opening and closing movements, respectively, for rocking the plates in opposite directions. More particularly, such parts are so arranged as to rock the plates in one of said directions toward the end of the closing movement of the gate and in the other of said directions toward the end of its opening movement.

With reference to the above-described form of the invention, these parts will be seen to comprise a pin 58 extending between the plates toward the right lower corners thereof, and another pin 59 extending between a pair of dogs 60 each of which is pivotally connected to a plate by pins 61 so as to dispose this pin adjacent the right upper corners of the plates. As can be seen from Figs. 5 to 8, the right upper corner of each plate is broken away as at 62 so as to accommodate the pin 59, and the dogs 60 are received within the upper portions of annular spaces 53 on each outer side of the plates. Also, as will be obvious from Fig. 4, the pins 61 do not extend between the plates 47, so that the gate 33 is permitted to pass upwardly into engagement with the pin 59. The gate is provided with tapered portions 63 adjacent its upper and lower ends for imparting outward forces to the pins as it comes into engagement therewith. Preferably, such portions 63 are provided on both sides of the gate so that it is reversible in position.

Figure 6:
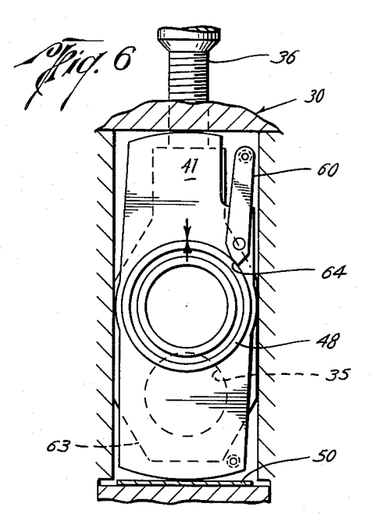
Fig. 6 is a view similar to Fig. 5, but with the gate lowered further toward its fully closed position.

It will be obvious that as the gates moves downwardly from the position of Fig. 6 to the position of Fig. 7, it will engage the pin 58 to rock the plates in a counterclockwise direction. The flat edge of the plates at the upper left side thereof provides a limit against rocking beyond a predetermined extent. Upon initial movement of the gate from closed to open position, the plates will remain in the rocked position of Fig. 7. However, toward the end of the opening movement of the gate, the pin 59 is engaged by the gate to urge bearing surfaces 64 on the opposite end of the dogs 60 into tight frictional engagement with the outer periphery of the seat elements 48. As a result, the dogs 60 are prevented from further swinging in a clockwise direction and the plates are rocked in a clockwise direction to the position of Fig. 8. Similarly to the previously described instance of counterclockwise rocking of the plates, the upper right hand flat edge portions of the plate 47 prevent clockwise rocking beyond a predetermined extent.

Figure 5:
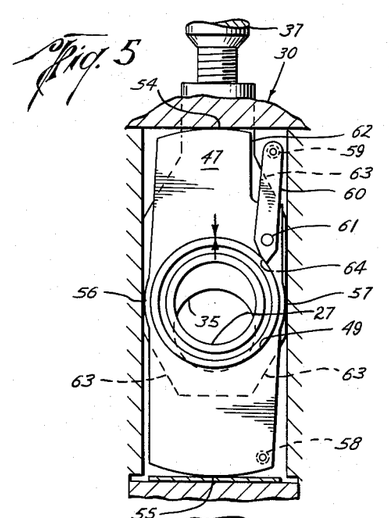
Fig. 5 is an elevational view of the gate and seat assembly in place within the cavity of the valve of Figs. 2 and 3, and during movement of the gate toward its closed position.

With particularly reference to Figs. 5 and 6, it will be noted that the flowway 27 through the valve body is choked and then actually closed prior to engagement of the gate with the lower pin 58. Thus, at the time the gate moves into engagement with the pins 58 for rocking the plates, it is forcefully engaged with the seat element 48 on the downstream side thereof. A pressure differential across the gate of, for example, 20 to 30 p.s.i. is sufficient to overcome the frictional resistance between the seat element and port 49 and hold the seat element against rocking with its plate, as illustrated by the arrows of Fig. 7.

However, upon movement of the gate toward its open position, the flowway will be opened fully or nearly so prior to engagement of the gate with the upper pin 59. Thus, there is little or no pressure differential across the gate at this time so that the seat elements are relatively free to rock with their respective plates, and rotation of the seat elements within the openings 49 is resisted by tight engagement of bearing surfaces 64 thereagainst. This rocking of the seat elements with the plates is illustrated by comparison of the arrows of Figs. 7 and 8.

Figure 2A:
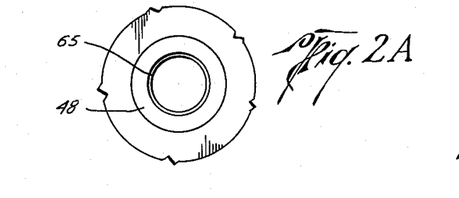
Fig. 2A is a partial sectional view of the gate valve of Fig. 2, and taken substantially along broken line 2A—2A to show the wear on the downstream seat element of the valve.

As a consequence of the foregoing, each cycle of opening and closing movement of the gate will normally rotate the downstream seat element in a predetermined rotational sense about the axis of its opening so as to present a new surface thereof for wear due to the impingement of fluid thereon. Thus, there will be a tendency for the inner peripheral edge of the seat element 48 to be worn evenly, as illustrated at 65 in Fig. 2A.

Figure 3:
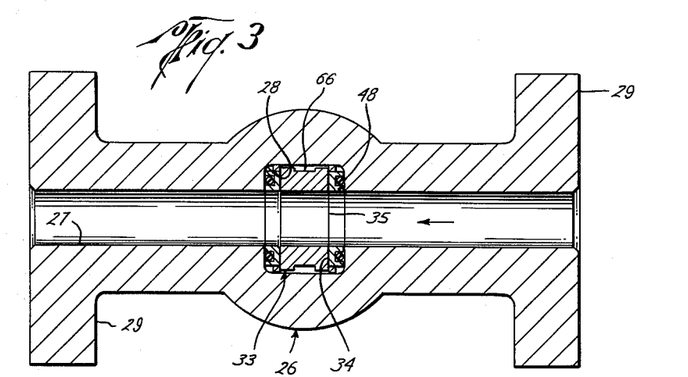
Fig. 3 is a horizontal sectional view of the valve of Fig. 2, taken substantially along broken line 3—3 of Fig. 2.
Figure 4:
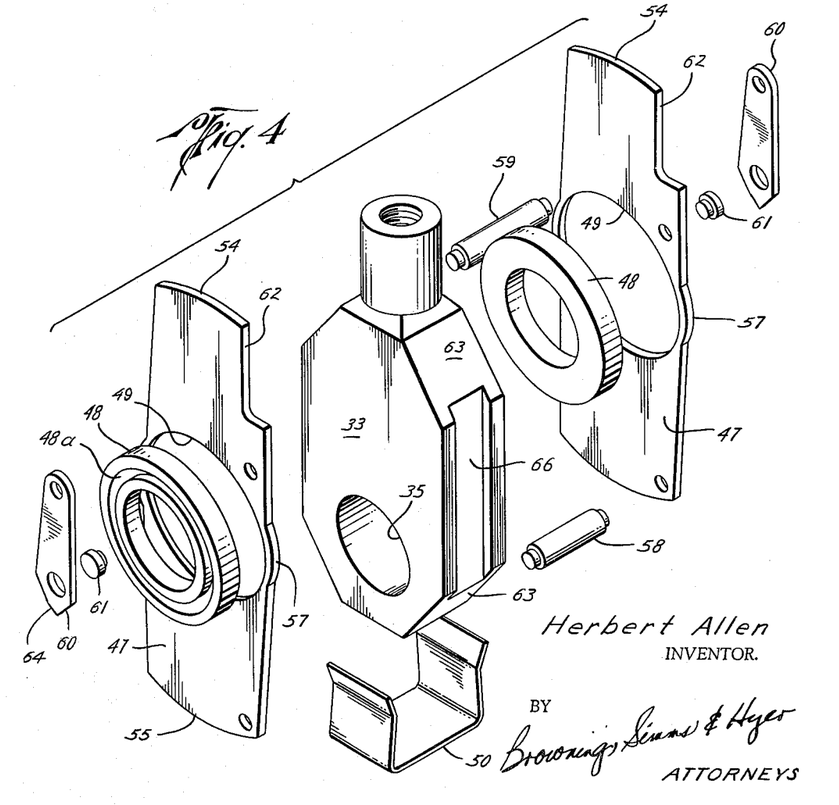
Fig. 4 is an enlarged exploded view of the gate and seat assembly of the valve of Figs. 2 and 3 removed from the cavity of the valve body.

With reference to Figs. 3 and 4, it will be seen that groves 66 are formed in each side edge of the gate to connect the upper and lower chambers 51 and 52 (see Fig. 2) above and below the gate without communication with the flowway. Furthermore, as shown in Figs. 5 to 8, the plates are of a height and width at least approximating the cross section of the guideway 34 so that when they are disposed adjacent opposite sides of the guideway, as shown, the chambers 51 and 52 will be confined to such an extent that grease will be circulated through the grooves 66 from one chamber to the other during movement of the gate 33 between opened and closed positions. As well known in the art, this facilitates movement of the gate within the guideway. It is more important to note, with respect to the present invention, that the plates 47 which carry the seat elements 48, and which are located between the bonnet and the sides and bottom of the valve body cavity, form these substantially confined grease chambers above and below the gate.

The other illustrative embodiment of a gate valve constructed in accordance with the preferred embodiment of the present invention will be seen from Figs. 9 to 13 to comprise a valve body 67 having a flowway 68 therethrough and a cavity 69 therein intersecting the flowway and opening to one side of the body. As in the case of the previously described embodiment of the invention, the valve body 67 may be provided with flanges 70 or other means on the opposite ends thereof for connection in a pipeline. As was also the case in the previously described embodiment, the cavity 69 is covered by a bonnet 71 which is removably connected to the body 67 by means of bolts 72. An annular seal ring 73 may be carried in the lower face of the bonnet for sealing engagement with the body when the bonnet is connected thereto.

The bonnet 71 supports a gate 74 for movement within a guideway 75 in the cavity between flowway opening and closing positions. Thus, the gate 74 is provided with an opening 76 therethrough which is alignable with the body flowway 68 in its open position (Figs. 9 and 10) and movable out of alignment therewith to close the flowway (Fig. 13).

The gate 74 includes a nut 77 to one side thereof for sliding movement between opposite sides of the body cavity 69, and a relatively thin paddle 78 removably connected to the nut and extending laterally therefrom for movement within the guideway 75. The nut 77 is connected to the lower threaded end 79 of a stem 80 which is carried within the bonnet against vertical movement during rotation upon manipulation of a part 81 extending outwardly from the upper end of the bonnet. This stem may be supported similarly to the stem 37 of the previously described embodiment of the invention, such that further description is not required.

As in the case of the earlier described embodiment, a pair of plates 82 are disposed within the cavity 69 of the valve body 67 transversely of the flowway and on both sides of the gate to form the guideway 75. Also, an annular seat element 83 is received within a port 84 through each plate for disposal axially of the flowway 68 through the valve body.

Figure 10:
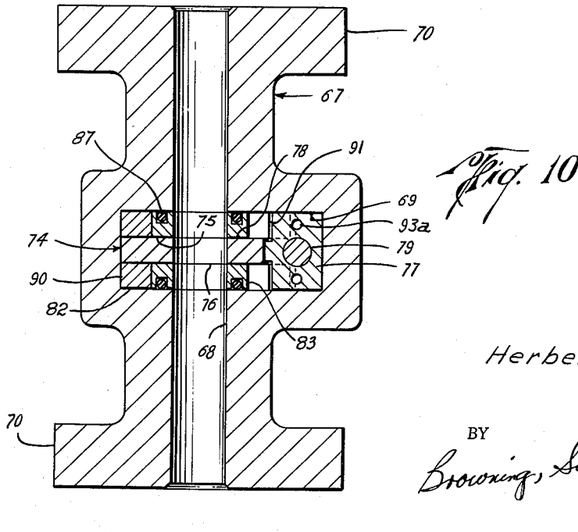
Fig. 10 is a horizontal sectional view of the form of gate valve shown in Fig. 9, and taken substantially along broken line 10—10 of Fig. 9.
Figures 11, 12, 13:
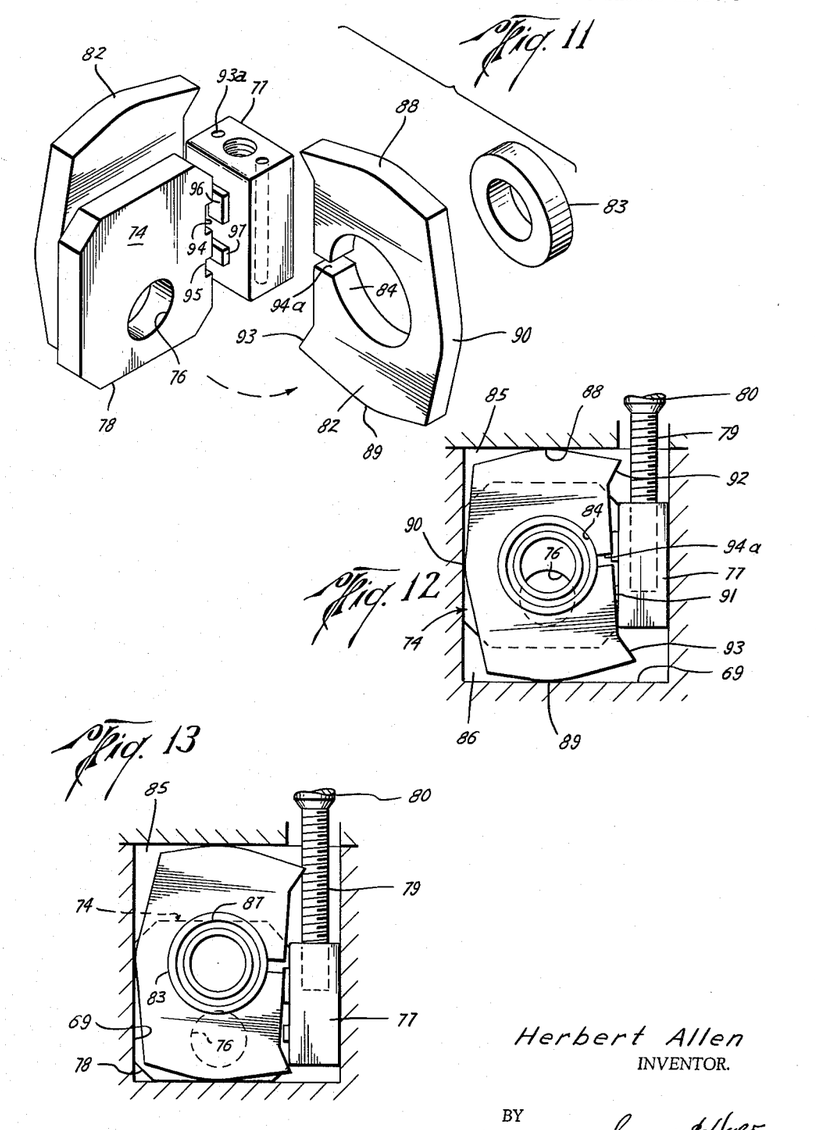
Fig. 11 is a perspective view, exploded in part, of the gate and seat assembly of the form of gate valve shown in Figs. 9 and 10 and removed from the cavity of the valve body.
Fig. 12 is an elevational view of the gate and seat assembly within the cavity and during movement of the gate from the open position of Fig. 9 toward its closed position.
Fig. 13 is a view similar to Fig. 12, but with the gate moved to its fully closed position.

As best shown in Fig. 10, the combined thicknesses of the plates 82 and the paddle 78 of the gate 74 correspond substantially to the width of the cavity 69 so that the inner surfaces of the plates 82 form the opposite sides of the guideway 75 for the gate, as previously mentioned. As will be more fully understood hereinafter, these plates also form grease chambers 85 and 86 above and below, resepctively, the gate 74. The side mounting of the gate is particularly well suited to the present invention as it permits the use of a thin paddle between the plates 82 and thereby reduces the overall size of the body cavity.

Upon removal of the bonnet 71 from the valve body 67, the gate 74 and plates 82 may be removed from the cavity 69 of the body to permit replacement of the seat elements 83. Also, as shown in each of Figs. 9, 12 and 13, the plates 82 are held between the bonnet and the bottom and opposite sides of the cavity 69 in the valve body for locating the seat elements in the manner previously described. Thus, as in the case of the plates 47 of the previously described embodiment of the invention, the top and bottom edges 88 and 89, respectively, and the side edges 90 of the plates furthest from the nut 77 are curved concentrically of the opening 84 through the plates, while the opposite side edges adjacent the nut include a relatively flat portion 91 so designed as to permit rocking of the plates relative to the nut and about the axis of the openings through the seat elements, as will be more apparent from the description to follow. The remaining edge portions of the plates may be flat and tapered in a manner to limit rocking of the plates to a desired amount.

Although it may not be apparent from the drawings, it will be understood that the seat elements 83 are of slightly greater thickness than their respective plates 82 so that a pressure differential across the gate will be effective to hold the downstream seat element tightly between the gate and the portion of the cavity surrounding the flowway 68. For the purpose of providing a fluid tight seal across the gate in this closed position, each of the seat elements is provided with a groove 87 therein carrying an O-ring for sealing engagement with the cavity.

The parts on the plates 82 engageable by the gate during its opening and closing movements, respectively, comprise tapered shoulders 92 and 93 so arranged adjacent the upper and lower right hand corners of the plates above and below the relatively flat edge portions 91 thereof as to rock the plates in one rotational direction toward the end of the closing movement of the gate and in the other rotational direction toward the end of its opening movement. The upper edge of the nut 77 will, toward the end of the opening movement of the gate, engage the shoulders 92 to exert an outward force on the plates for rocking them in a counterclockwise direction. On the other hand, toward the end of the closing movement of the gate, the lower edge of the nut 77 will engage the tapered shoulders 93 to exert an outward force on the plates for rocking them in a clockwise direction. Due to the shape of the relatively flat edge portion 91 of the plates, they are urged in neither direction during the initial opening and closing movements of the gate as well as intermediate same.

The port 84 through each of the plates is split along one side thereof at 94a for flexure between a position tightly receiving its respective seat element 83 therein and another position permitting removal or insertion of said seat element. Obviously, this enables the provision of a desired amount of frictional resistance to rotation of each seat element within its port 84. According to the present invention, it is contemplated that the frictional resistance so provided will be sufficient to cause the downstream seat element 83 to rock with its respective plate 82 in all but the closed and almost closed positions of the gate, when a pressure differential normally exists across the gate. Thus, upon opening movement of the gate from the Figure 12 to the Figure 9 position, for example, the downstream seat element 83 will be rocked with its plate. However, upon closing movement of the gate from a position such as shown in Fig. 12 to the position of Fig. 13, the pressure differential across the gate will be sufficient to hold the downstream seat element against rotation with the plate in which it is mounted while said plate is rocked in a clockwise direction.

Thus, it is obvious that this embodiment of the invention also serves to rotate the downstream seat element in a predetermined rotational sense about the axis of its opening in response to each cycle of opening and closing movement of the gate. Although this last described embodiment is simpler of construction than the first, normally it is not operable over the wide range of flow conditions contemplated with respect to the earlier described embodiment. That is, in this last described embodiment, there is no means for applying a desired degree of frictional resistance to rotation of the downstream seat element relative to its plate during selected cycles of plate rotation.

The plates 82 extend substantially coextensively of the cavity 69 adjacent the nut 77, and the side edge portions 91 of the plates are disposed close to the inner side of the nut so that the nut and plates cooperate to at least substantially confine the chambers 85 and 86 above and below the gate and hold the plates against lateral shifting within cavity 69. As shown in each of Figs. 10 and 11, the nut 77 may be provided with one or more passages or grooves 93a therethrough connecting the chambers 85 and 86 so as to circulate grease contained therein from one chamber to another upon movement of the gate between opened and closed positions. Obviously, as in the case of the earlier described embodiment, this means of communication may, if desired, be so located within the plates or valve body as to prevent communication between the chambers and the flowway.

It is obvious that in order for this valve to work properly, the paddle 78 must be connected to the nut 77 with the opening 76 therethrough disposed adjacent its lower edge. In order to prevent the paddle from being improperly assembled, the releasable connecting means previously mentioned comprises a pair of differently sized slots 94 and 95 in a side edge of the paddle closely fittable over correspondingly formed keys 96 and 97, respectively, on the inner side of the nut. Such a connection is sufficient for the purposes of the present invention as it prevents relative vertical movement between the paddle and nut when they are held against relative horizontal movement within the cavity 69.

Figure 14:
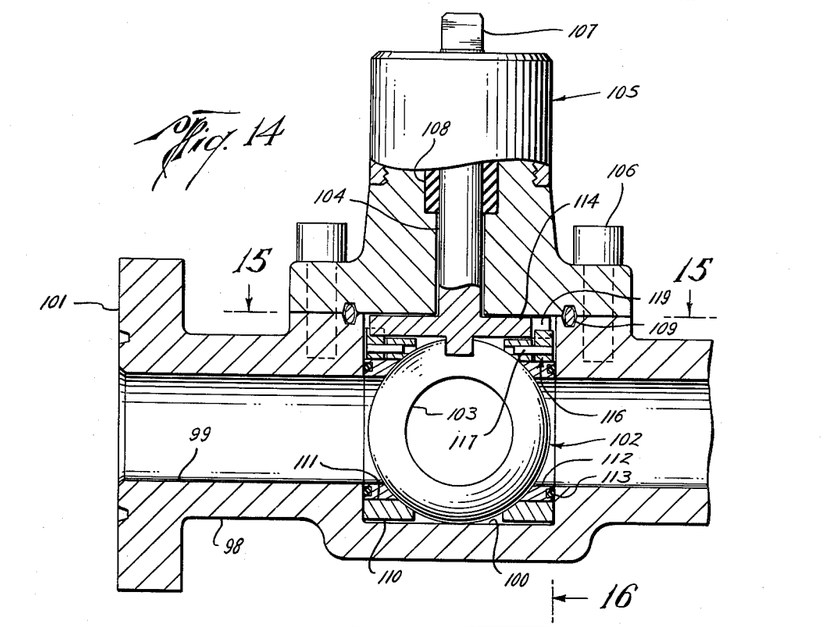
Fig. 14 is a vertical sectional view of a rotary plug type valve constructed in accordance with the preferred embodiment of the present invention, and in a closed position.

Referring now to Figs. 14 to 18, the rotary plug valve embodiment of the preferred embodiment of the present invention will be seen to comprise a body 98 having a flowway 99 therethrough and a cavity 100 therein intersecting the flowway and opening to one side of the body. The opposite ends of the body 98 may be provided with flanges 101 or other suitable means for connection in a pipeline. The valve member includes a ball 102 having an opening 103 therethrough and mounted for rotation within the cavity between an open position in which the opening 103 is aligned with the flowway 99 and a closed position in which the solid portion of the ball is disposed transversely of the flowway, as shown in Fig. 14.

As shown in Fig. 14, the ball 102 is releasably connected to a stem 104 rotatably mounted within a bonnet 105 for moving the opening 103 through the ball into and out of alignment with the body flowway 99. As in the case of the gate valve embodiments previously described, the bonnet is releasably connected to the valve body by bolts 106 so as to cover the opening from the cavity 100, and the stem 104 is provided with a part 107 extending outwardly of the bonnet so as to permit rotation of the ball valve. As indicated in Fig. 14, a packing 108 may be supported within the bonnet for sealing about the stem 104, and a ring 109 may be held between grooves on the opposing faces of the bonnet and valve body for sealing therebetween.

The replaceable seat element assembly of this embodiment of the invention includes a carrier 110 disposed within the body cavity on each opposite side of the ball 102, and provided with a port 111 therethrough for receiving an annular seat element 112 axially of the flowway 99. The inner surface of each carrier and seat element mounted therein is curved to fit the ball. However, although it may not be apparent from the drawings, each seat element is slightly thicker than its carrier so that when a pressure differential is established across the ball due to choking or closing of the flowway, the downstream seat element is held tightly against the surface on the body cavity which surrounds the intersection of the cavity with the flowway. For this purpose, the aforementioned releasable connection of the stem and ball comprises a tongue and groove disposed parallel to the opening 103 so that the ball has a certain amount of freedom in bearing against the seat element. The outer side of each seat element may be provided with an annular groove for receiving an O-ring 113 or the like for sealing with this last-mentioned surface.

Figure 16:
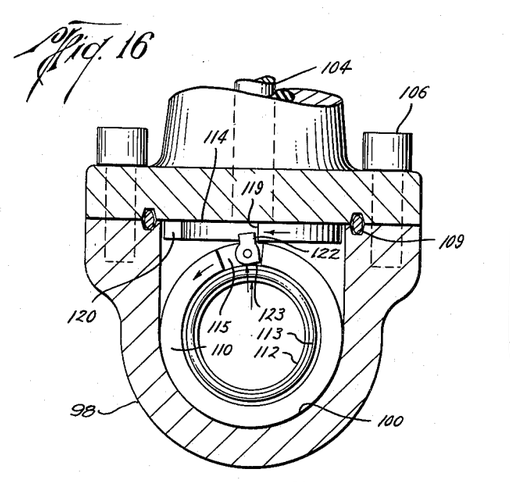
Fig. 16 is a cross sectional view of the plug valve in a closed position, and taken substantially along broken line 16—16 of Fig. 15.

Upon removal of the bonnet 105 from the valve body 98, the ball 102 and the carriers 110 may be removed from the cavity 100 of the valve body to permit replacement of the seat elements 112. Furthermore, as best shown in Figs. 14 and 16, the carriers are located in proper position within the cavity by means of the bonnet and the bottom and opposite sides of the cavity 100. Thus, the lower end of the stem 104 of the ball valve member is provided with a flange 114 against which the bonnet bears, and which, in turn, bears against the upper edges of the carriers. Thus, as the replaceable seat element assembly is disposed within the cavity, and the bonnet is connected above the valve body so as to cover the opening therefrom, the carriers will be located in a manner to dispose the annular seat elements 112 axially of the flowway 99.

As in the case of the preferred gate valve embodiments of the present invention, the carriers 110 of the valve of Figs. 14 to 18 are provided with parts engageable by the valve member during its opening and closing movements, respectively, for rotating the carriers in opposite directions. More particularly, these parts on the carriers are so arranged as to rotate the carriers in one of said rotational directions toward the end of the closing movement of the valve member and in the other of said directions toward the end of its opening movement.

Thus, each of the carriers 110 is recessed at 115 to receive a dog 116 pivotally connected thereto by a pin 117 in a manner to dispose a part 118 thereof above the upper edge of the carrier. The flange 114 on the lower end of the stem 104 of the ball valve member is also recessed at opposite sides thereof so as to provide two pairs of oppositely disposed shoulders 119 and 120 movable into and out of engagement with oppositely disposed surfaces 121 and 122 on the dog part 118. More particularly, these shoulders are so arranged with respect to the opening 103 through the ball as to engage with the parts 118 so as to rotate the carriers in one direction during the latter portion of the opening movement of the ball, and to engage with said parts so as to rotate the carriers in an opposite direction during the latter portion of the closing movement of the ball.

Figures 15, 15A:
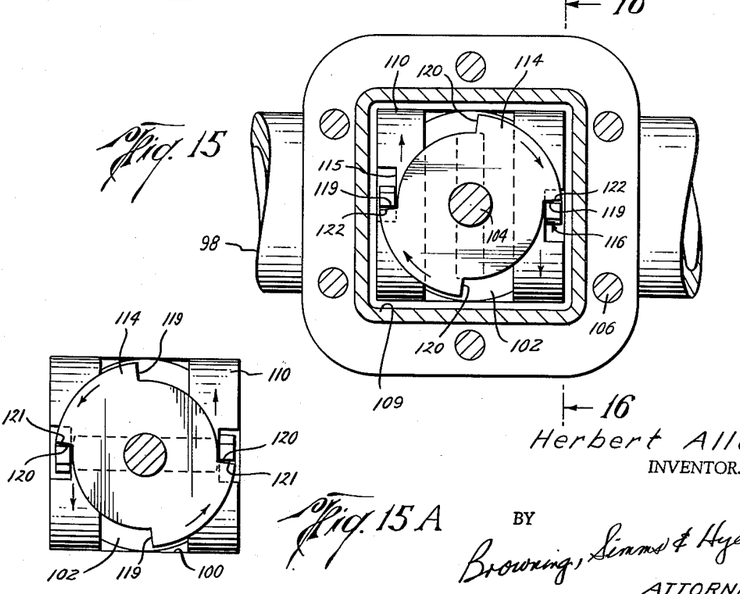
Fig. 15 is a horizontal sectional view of the valve of Fig. 14, also in a closed position and taken substantially along broken line 15—15 thereof.
Fig. 15A is a top plan view of the seat element assembly of the valve of Figs. 14 and 15, removed from the valve body and with the plug in a position to open the valve.

Thus, toward the end of the movement of the valve member into the closed position of Figs. 14 to 16, the shoulders 119 on the flange 114 will engage with the surfaces 122 on the dog part 118 so as to rotate each of the carriers counterclockwise, as indicated by the arrows in Fig. 16. Of course, during this cycle of closing movement of the ball valve member, the seat element on the downstream side of the valve body will be forcefully engaged with the seating surface on the body cavity by means of the pressure differential across the valve member. On the other hand, toward the end of the opening movement of the ball valve member, the shoulders 120 on the flange 114 will engage with surfaces 121 on the dog parts 118 so as to rotate each of the carriers clockwise, as indicated by the arrow in Fig. 16A. Inasmuch as there is little or no pressure differential across the ball valve member during this cycle of its opening movement, the downstream seat elements will not be forced against the seating surface of the body cavity and will be relatively free to rotate with their respective carriers.

Figure 16A:
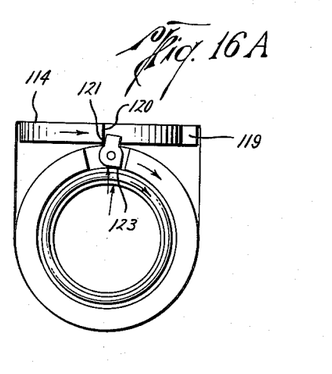
Fig. 16A is a side elevational view of the seat element assembly of the ball valve, removed from the valve body and with the ball in a position to open the valve.
Figure 17:
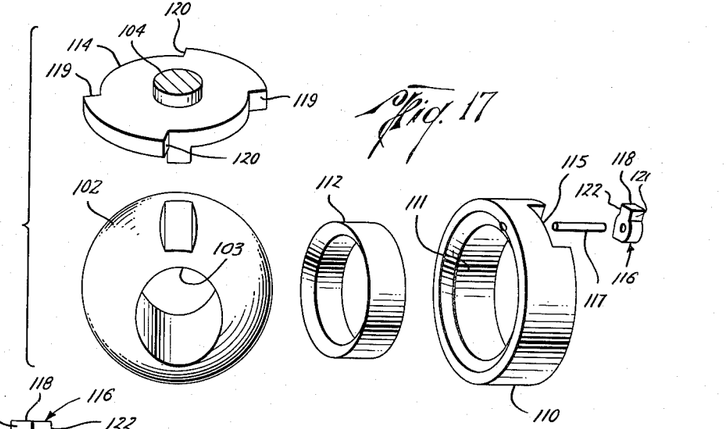
Fig. 17 is an exploded view of parts of the replaceable seat element assembly of the ball valve.
Figure 18:
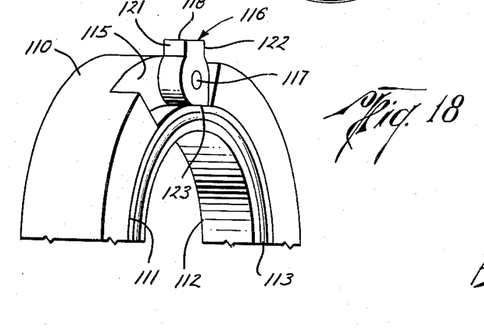
Fig. 18 is an enlarged perspective view of a seat element and carrier of the replaceable assembly of Fig. 17.

As shown in Figs. 16 and 16A, the end of each dog 116 opposite the part 118 is provided with a surface 123 which is adapted to bear against the outer periphery of the seat element mounted within the carrier when the dog is rotated in a clockwise direction, but adapted to be moved out of bearing engagement therewith when said dog is rotated in a counterclockwise direction. Thus, toward the end of the closing movement of the ball valve member, the shoulder 119 of the flange 114 will swing the dog in a counterclockwise direction, as viewed in Fig. 16, to move the surface 123 out of bearing engagement with the seat element, such that the latter is held against rotation with the carrier in which it is mounted, as indicated by the arrows of Fig. 16. It will be noted from this latter figure that when the dog is so rotated, its surface 122 is maintained in position for engagement by shoulder 119 due to engagement of the dog with the right hand side of recess 115.

On the other hand, toward the end of the opening movement of the ball valve member, the shoulder 120 swings the dog in a clockwise direction, as viewed in Fig. 16A, to move surfaces 123 into tight frictional engagement with the seat element periphery so as to rotate the seat element with said carrier, as indicated by the arrows of Fig. 16A. As will also be seen from this last-mentioned figure, the surface 121 on the dog part 118 is maintained in position for engagement by shoulder 120 on the flange 114 due to engagement of bearing surface 123 with the seat element periphery, inasmuch as this latter engagement prevents further clockwise rotation of the dog.

It should be understood that the ball valve above described is merely illustrative of rotary plug type valves, and that the novel teachings of the present invention may also be applied to such valves having cylindrical or frusto-conical plugs, as desired.

Figures 19, 20, 21, 22:
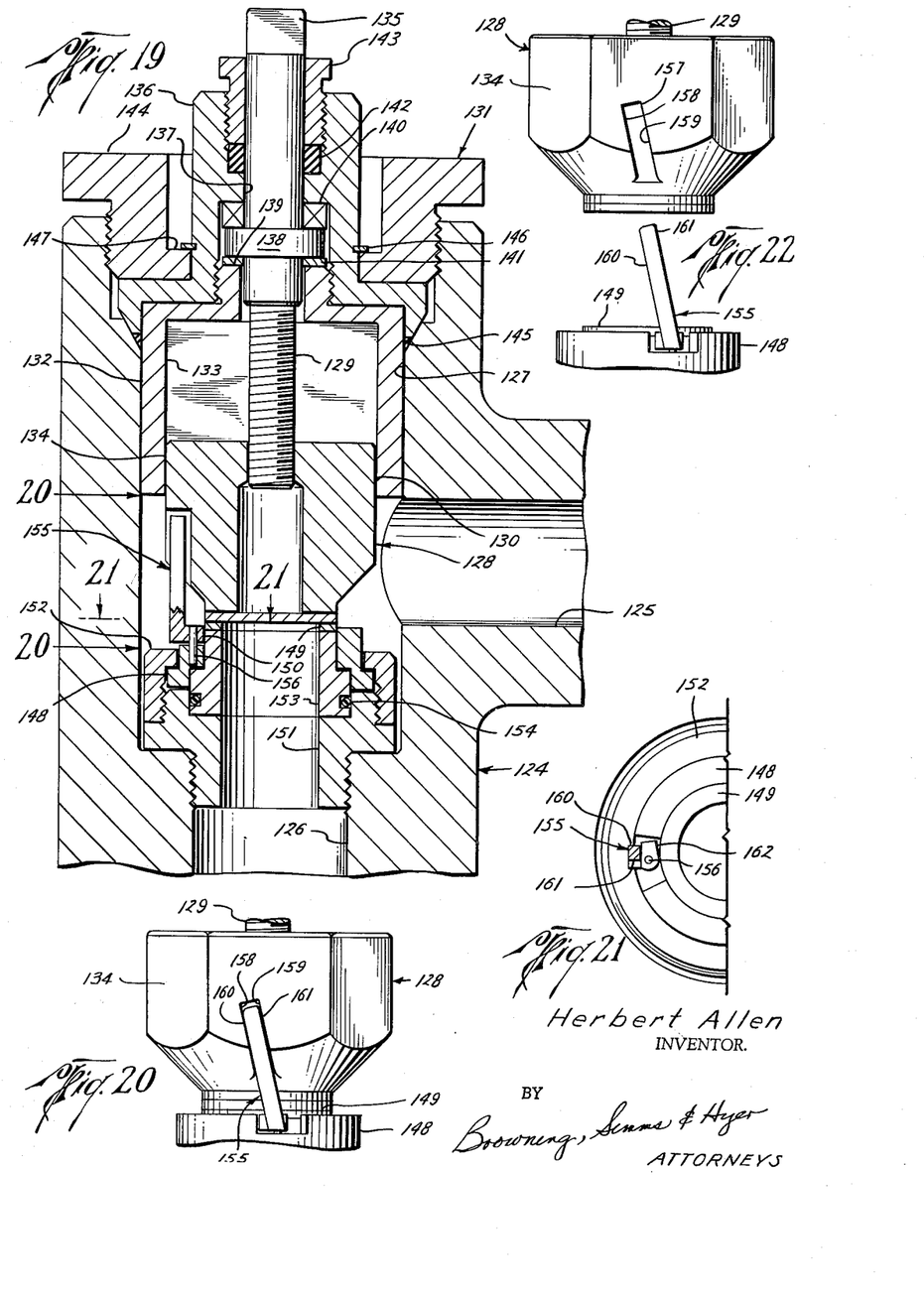
Fig. 19 is a vertical sectional view of an angle type valve constructed in accordance with the preferred embodiment of this invention, and in its closed position.
Fig. 20 is an elevational view, as seen along broken line 20—20 of Fig. 19, of a portion of the valve member and replaceable seat assembly of the angle valve in its closed position.
Fig. 21 is a partial cross sectional view of the angle valve of Figs. 19 and 20, also in the closed position, and taken substantially along broken line 21—21 of Fig. 19.
Fig. 22 is an elevational view of the angle valve, similar to Fig. 20, but with the valve in an open position.

Referring now to Figs. 19 to 22, the preferred angle valve embodiment of the present invention will be seen to comprise a valve body 124 having a flowway made up of inlet and outlet portions 125 and 126, respectively, disposed at approximately right angles to one another and intersected by a cavity 127 opening to one side of the valve body. A valve member 128 having a valve head 130 at its lower end is mounted on the body for reciprocation within the cavity axially of the outlet portion 126 of the flowway for opening (Fig. 22) and closing same. For this purpose, the valve head is threadedly connected to the lower end of a non-rising stem 129 supported from a bonnet 131 threadedly connected to the body for covering the opening from the cavity therein. More particularly, as shown in Fig. 19, the bonnet includes a guideway 132 extending into the body cavity 127 and having an inner hexagonal surface 133 for fitting closely about a similarly shaped outer surface 134 of the valve head 130. As in the case of the last-described embodiments of the invention, the stem 129 may be provided with a part 135 projecting outwardly from the bonnet 131 for imparting rotation to the stem.

Although the details of the bonnet 131 are not important to the present invention, it will be seen from Fig. 19 to comprise generally a body 136 threadedly connected to the guideway 132 and provided with a reduced diameter portion 137 for receiving the valve stem 129 therethrough. A flange 138 on an intermediate portion of the stem is held between the portion 137 and an upwardly facing shoulder 139 on the guideway 132. A bearing 140 may be carried above the flange and a thrust ring 141 therebelow. The upper end of the body 136 carries a packing 142 and a gland nut 143 therefor so as to seal about the rotating stem.

The body 136 of the bonnet is releasably held in position over the opening from the cavity by means of a nut 144, and is sealed with respect to the body by means of a seal ring 145 below its lower edge between the guideway 132 and the valve body. A snap ring 146 disposed about the body and above an inner shoulder 147 on the nut 144 enables the bonnet 131 to be handled as a unit. Thus, as is obvious from Fig. 19, the nut may be disconnected from the cavity side opening and lifted therefrom to remove the valve member.

As previously mentioned, the arrangement of the flowway portions 125 and 126 for this type of valve is such that the flow from the inlet portion 125 is caused to impinge upon the edge of the surface surrounding the intersection of the cavity with the outlet portion which is furthest from the inlet portion. As a consequence, this edge portion of the seating surface of the valve is worn considerably more than the other portions thereof.

In accordance with the present invention, and similarly to the above-described embodiments, a carrier 148 is disposed within the valve body cavity and an annular seat element is received within a port 150 through the carrier for engagement between the valve member in its closed position and the aforementioned seating surface which surrounds the intersection of the cavity with flowway portion 126.

More particularly, a member 151 threadedly connected to the body is provided with an opening therethrough forming a continuation of flowway portion 126, and the carrier 148 is mounted concentrically of the member by means of a cap 152 connected thereto. Thus, the seat element received within the carrier port is disposed axially of the outlet flowway portion for engagement between the surface on member 151 surrounding the opening therethrough and the lower end of the valve head in its closed position. This seat element will be seen to comprise a hard metal ring 149 adhered to a lower tubular support 153 which carries an O-ring 154 for sealing with respect to member 151.

As in the case of the previously described preferred embodiments of the invention, this seat element will be forced, during initial opening and final closing movement of the valve member, into tight engagement with the afore-mentioned surface on member 151 which surrounds the intersection of the cavity with the downstream side of the flowway therethrough. This, of course, is due to the pressure drop across the flowway as the opening therethrough is choked.

The carrier 148 is provided with parts engageable by the valve member during its opening and closing movements, respectively, for rocking the carrier in opposite directions. More particularly, and as was the case in the previously described embodiments, such parts are so constructed and arranged as to rotate the seat element 149 with the carrier during its rotation in one of said directions, but are ineffective to cause rotation of the seat element therewith during rotation of the carrier in the other of said directions.

For this purpose, a dog 155 is pivotally connected to a recessed portion of the carrier 148 by means of a pin 156, and the head 130 of the valve member 128 is provided with a groove 157 therein having oppositely disposed shoulders 158 and 159 engageable with oppositely facing surfaces 160 and 161, respectively, on an upwardly extending portion of the dog 155 for rotating the carrier in said opposite directions. That is, as will be understood from Figs. 20 and 22, as the valve member moves into closed position, shoulder 159 will engage with surface 161 on dog 155 so as to rotate the carrier in a clockwise direction, as viewed from Fig. 21. On the other hand, as the valve member moves from the closed position of Fig. 20 to the open position of Fig. 22, the shoulder 158 will engage with surface 160 on the dog 155 so as to rotate the carrier in a counterclockwise direction.

In a manner similar to the above-described rotary plug valve embodiment of the present invention, the dog 155 has a bearing surface 162 which is adapted to tightly engage the outer periphery of the seat element when the dog is swung in one direction about the pin 156 and to move out of bearing engagement with the seat element periphery when the dog is swung in the opposite direction. From Fig. 21, it will be obvious that the dog is swung in a clockwise direction so as to bear against the seat element and thus require its rotation with the carrier during closing movement of the valve member. On the other hand, during opening movement of the valve member, the dog will be swung in a counterclockwise direction so as to move bearing surface 162 out of engagement with the periphery of the seat element, and thus permit it to be held against rotation with the carrier due to the pressure differential thereacross.

As was also the case in the rotary plug valve embodiment of the invention, the dog 155 is adapted to bear against the seat element and the recessed portion of the carrier in such a manner as to maintain surfaces 160 and 161 thereon in position for engagement by shoulders 158 and 159.

Figure 23:
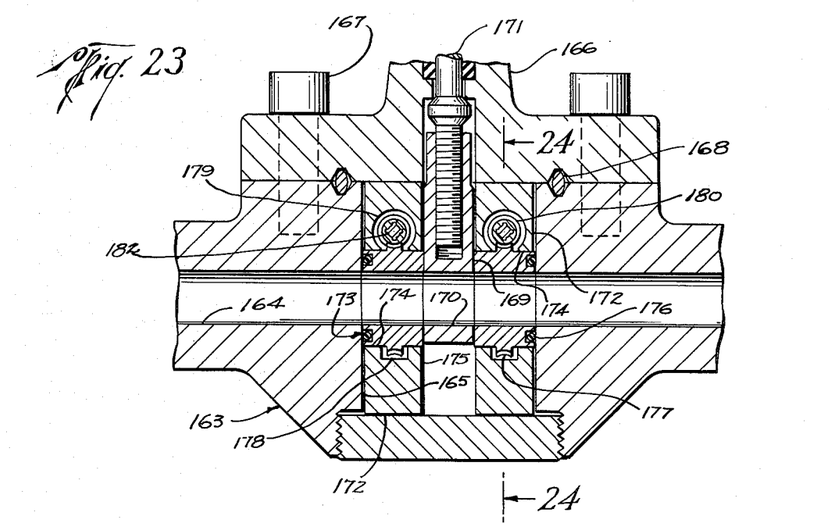
Fig. 23 is a longitudinal sectional view of another form of gate valve constructed in accordance with the present invention, and with the gate in its open position.
Figure 24:
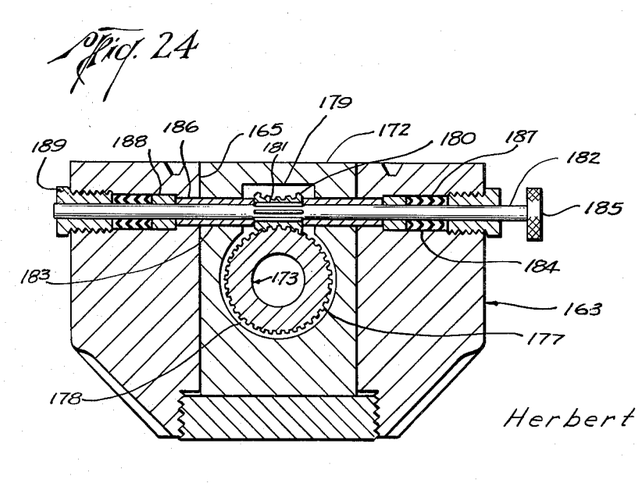
Fig. 24 is an enlarged cross-sectional view of the valve of Fig. 23, taken substantially along broken line 24—24 thereof, and with the bonnet removed.

The gate valve embodiment of Figs. 23 and 24 is, in many respects, similar to those above described. Thus, it includes a valve body 163 having a passageway 164 therethrough and a cavity 165 therein intersecting the flowway and opening to one side of the body. The opposite ends of the body may be provided with any suitable means (not shown) for connection in a flow line.

The opening from the cavity 165 is covered by a bonnet 166 releasably and sealably connected to the body by means of bolts 167 and an annular seal ring 168 received in oppositely disposed grooves in the bonnet and body. A gate 169 having an opening 170 therethrough is connected to the lower end of a stem 171 which may be supported from the bonnet, in a manner shown in Fig. 2, for reciprocating the gate within the cavity between positions aligning and disaligning gate opening 170 with passageway 164. When in the latter position, the solid portion of gate 169 is disposed across the passageway for closing the valve.

As was the case in the previously described gate valve embodiments of the invention, plates 172 are disposable within the cavity 165 on both sides of the gate. Each of these plates is provided with a port 174 for receiving an annular seat element 173 in position to be engaged between the gate and a seating surface on the valve body surrounding the intersection of passageway 164 with the cavity of the valve body.

More particularly, each plate is of a thickness to substantially fill the cavity on opposite sides of the gate and thereby form a guideway 175 for the gate, as shown in Fig. 23. However, it is contemplated that each seat element 173 will be slightly thicker than the plate in which it is mounted so as to form a tight seal with the aforementioned body seating surface. For this purpose, an O-ring 176 is carried in the outer side of each such element.

As was also the case in the previously described gate valve embodiments, the upper, lower and side edges of the plates are held between the bottom and side walls of the valve body and the lower side of the bonnet, so that they are properly located in the positions shown merely upon connection of the bonnet to the valve body.

The gate valve embodiment of Figs. 23 and 24 differs from those above described in that the seat elements 173 thereof may be rotated in a predetermined rotational sense independently of the operation of the valve element and, more particularly, in response to manipulation of an actuator extending exteriorly of the valve body. Thus, each seat element is provided with worm teeth 177 about its outer periphery which is freely movable, upon rotation of the seal element about the axis of its opening, within an annular recess 178 formed in the port 174 through each plate intermediate its opposite sides. Each plate is also provided with a chamber 179 therein communicating with recess 178 and freely receiving a worm gear 180 for engagement with the worm teeth 177 on each seat element.

More particularly, each worm gear is splined as at 181 to a shaft 182 extending through openings 183 in the plates and 184 in the valve body, as shown in Fig. 24. One end of each shaft is provided with a knurled hand wheel 185 or other actuator for rotating the seat element about the axis of its opening. Obviously, the frequency and direction of rotation may be selected by the operator for the purpose of distributing wear in a manner desired.

The spline on each shaft is positioned longitudinally for engagement with the spline on worm gear 180 by means of bearings 186 which are, in turn, held in place by packing 187 and a ring 188 for sealing about the shaft on both sides of chamber 179 and gland nuts 189 threadedly secured in valve body openings 184 in surrounding relation to the shaft.

Each hand wheel 185 may, of course, be removable from its shaft such that the gland nut, packing, ring and bearing may be removed from the openings 183 and 184 on one side of the chamber 179, so as to permit the spline on the shaft to be pulled through such openings in removing the shaft from said one side. Upon further removal of the gland nut, packing, ring and bearing from the other side of the chamber, as well as removal of the bonnet (see Fig. 24), the plates 172 are releasable for removal from the valve body cavity to permit replacement of the seat elements. Obviously, the worm gear 180 is properly located in position for splining with its shaft when the plates are disposed within the cavity and the bonnet connected to the valve body.

Obviously, other suitable means may be provided for rotating the seat elements, and it is contemplated they are within the scope of the present invention.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising a body having a flowway therethrough and a cavity therein intersecting the flowway, a valve member mounted on the body for movement within the cavity between flowway opening and closing positions, a seat element having an opening therethrough and carried within the body with its opening forming a continuation of the flowway therethrough for rotation about its opening and for seating in a plurality of rotational positions between the valve member in its closed position and a surface on the body, and means responsive to each cycle of opening and closing movement of the valve member for rotating the seat element from one predetermined rotational seating position to a different predetermined rotational seating position than said one position to thereby distribute wear about the seat element.

2. A valve, comprising a body having a flowway therethrough and a cavity therein intersecting the flowway, a valve member mounted on the body for movement within the cavity between flowway opening and closing positions, a pair of seat elements each having an opening therethrough and carried within the body for rotation about its opening and for seating in a plurality of rotational positions between the valve member in its closed position and a surface on the body which surrounds the flowway adjacent its intersection with the cavity, and means responsive to each cycle of opening and closing movement of the valve member for rotating the downstream seat element from one predetermined rotational seating position to a different predetermined rotational seating position than said one position to thereby distribute wear about the downstream seat element.

3. A valve, comprising a body having a flowway therethrough and a cavity therein intersecting the flowway, a valve member mounted on the body for movement within the cavity to open and close the flowway, means for moving the valve member between opened and closed positions, a seat element having an opening therethrough, a carrier in the cavity mounting the seat element with its opening forming a continuation of the flowway through the valve body for rotation about its opening and for seating in a plurality of rotational positions between the valve member in its closed position and a surface on the body, and means responsive to actuation of the valve member moving means for rotating the seat element within the carrier from one predetermined rotational seating position to a different predetermined rotational seating position than said one position to thereby distribute wear about the seat element.

4. A valve, comprising a body having a flowway therethrough and a cavity therein intersecting the flowway, a valve member mounted on the body for movement within the cavity to open and close the flowway, a seat element having an opening therethrough, a carrier in the cavity mounting the seat element with its opening forming a continuation of the flowway through the valve body for engagement between the valve member in its closed position and a surface on the body, means responsive to movement of the valve member between opened and closed positions, respectively, for rotating the carrier in opposite rotational directions about the axis of the opening through the seat element, and means for rotating said seat element with the carrier upon movement of the valve member into one of said positions and enabling it to be held against rotation therewith upon movement of the valve member into the other of said positions.

5. A valve, comprising a body having a flowway therethrough and a cavity therein intersecting the flowway, a valve member mounted on the body for movement within the cavity to open and close the flowway, means for moving the valve member between opened and closed positions, a pair of seat elements each having an opening therethrough, a pair of carriers in the cavity each mounting a seat element for rotation about its opening and for seating in a plurality of rotational positions between the valve member in its closed position and a surface on the body which surrounds the flowway adjacent its intersection with the cavity, and means responsive to actuation of the valve member moving means for rotating each of said seat elements within the carrier in which it is mounted from one predetermined rotational seating position to a different predetermined rotational seating position than said one position to thereby distribute wear about each seat element.

6. A valve, comprising a body having a flowway therethrough and a cavity therein intersecting the flowway, a valve member mounted on the body for movement within the cavity to open and close the flowway, a pair of seat elements each having an opening therethrough, a pair of carriers in the cavity each mounting a seat element for engagement between the valve member in its closed position and a surface on the body which surrounds the flowway adjacent its intersection with each side of the cavity, means responsive to movement of the valve member between opened and closed positions, respectively, for rotating each of said carriers in opposite directions about the axis of the opening through the seat element mounted therein, and means for rotating the downstream seat element with the carrier in which it is mounted upon movement of the valve member into one of said positions and enabling it to be held against rotation therewith upon movement of the valve member into the other of said positions.

7. A valve, comprising a body having a flowway therethrough and a cavity therein intersecting the flowway, a valve member mounted on the body for movement within the cavity to open and close the flowway, a seat element having an opening therethrough, a carrier in the cavity mounting the seat element with its opening forming a continuation of the flowway through the valve body for engagement between the valve member in its closed position and a surface on the body, parts on said carrier engageable by parts on the valve member during its opening and closing movements, respectively, to rotate the carrier in opposite directions, and means providing frictional resistance to rotation of the seat element within the carrier for rotating the seat element with the carrier, said means being ineffective to overcome the force exerted upon the seat element due to pressure differentials thereacross upon rotation of the carrier in one of said directions during one of the initial opening and final closing movements of the valve member.

8. A valve of the character defined in claim 7, wherein said frictional resistance providing means comprises a dog hingedly connected to the carrier and swingable into tight frictional engagement with said seat element upon rotation of the carrier in the other of said directions.

9. A valve, comprising a body having a flowway therethrough and a cavity therein intersecting the flowway, a valve member mounted on the body for movement within the cavity to open and close the flowway, a seat element having an opening therethrough, a carrier in the cavity mounting the seat element with its opening forming a continuation of the flowway through the valve body for engagement between the valve member in its closed position and a surface on the body, parts on the carrier positioned for engagement by parts on the valve member toward the end of its opening and closing movements, respectively, to rotate the carrier in opposite directions, and means providing frictional resistance to rotation of the seat element within the carrier for rotating the seat element with the carrier during opening movement of the gate, said means being ineffective to overcome the force exerted by the valve member upon the seat element due to pressure differentials thereacross toward the end of its closing movement.

10. A valve of the character defined in claim 9, wherein said frictional resistance providing means comprises a port through the carrier tightly receiving said seat element.

11. A valve of the character defined in claim 9, wherein said frictional resistance providing means comprises a dog hingedly connected to the carrier and swingable into tight frictional engagement with the seat element toward the end of the opening movement of the valve member.

12. A valve, comprising a body having a flowway therethrough and a cavity therein intersecting the flowway and opening to one side of the body, a bonnet removably connected to the body for covering the opening from the cavity therein, a valve member supported by the bonnet for movement within the cavity to open and close the flowway, a seat element having an opening therethrough, a carrier in the cavity mounting the seat element with its opening forming a continuation of the flowway through the valve body for rotation about its opening and for seating in a plurality of rotational positions between the valve member in its closed position and a surface on the body, and means for rotating the seat element within the carrier from one such rotational seating position to a different rotational seating position than said one position to thereby distribute wear about the seat element, and both said carrier and seat element being removable from the cavity of the body upon removal of the bonnet therefrom.

13. A valve, comprising a body having a flowway therethrough and a cavity therein intersecting the flowway and opening to one side of the body, a bonnet removably connected to the body for covering the opening from the cavity therein, a valve member supported by the bonnet for movement within the cavity to open and close the flowway, a seat element having an opening therethrough, a carrier in the cavity mounting the seat element for rotation about its opening and for seating in a plurality of rotational positions between the valve member in its closed position and a surface on the body which surrounds the flowway adjacent its intersection with the cavity, and means for rotating the seat element within the carrier from one such rotational seating position to a different rotational seating position than said one position to thereby distribute wear about the seat element, and both said carrier and seat element being removable from the cavity of the body upon removal of the bonnet therefrom, wherein the carrier is held between the bonnet and walls of the cavity by engagement therewith.

14. A valve, comprising a body having a flowway therethrough and a cavity therein intersecting the flowway and opening to one side of the body, a bonnet removably connected to the body for covering the opening from the cavity therein, a valve member supported by the bonnet for movement within the cavity to open and close the flowway, a seat element having an opening therethrough, a carrier in the cavity mounting the seat element with its opening forming a continuation of the flowway through the valve body for engagement between the valve member in its closed position and a surface on the body, means responsive to movement of the valve member between opened and closed positions, respectively, for rotating the carrier in opposite directions, and means for rotating said seat element with the carrier upon movement of the valve member into one of said positions and enabling it to be held against rotation therewith upon movement of the valve member into the other of said positions, and each of said carrier and seat element being removable from the cavity of the body upon removal of the bonnet therefrom.

15. A valve of the character defined in claim 14, wherein the carrier is held between the bonnet and walls of the cavity.

16. A valve, comprising a body having a flowway therethrough and a cavity therein intersecting the flowway and opening to one side of the body, a bonnet removably connected to the body for covering the opening from the cavity therein, a valve member supported by the bonnet for movement within the cavity to open and close the flowway, a pair of seat elements each having an opening therethrough, a pair of carriers in the cavity each mounting a seat element for rotation about its opening and for seating in a plurality of rotational positions between a side of the valve member in its closed position and a surface on the body which surrounds the flowway adjacent its intersection with the cavity, and means for rotating each of said seat elements within the carrier in which it is mounted from one such rotational seating position to a different rotational seating position than said one position to thereby distribute wear about the seat element, and each of said carriers and seat elements being removable from the cavity of the body upon removal of the bonnet therefrom.

17. A valve, comprising a body having a flowway therethrough and a cavity therein intersecting the flowway and opening to one side of the body, a bonnet removably connected to the body for covering the opening from the cavity therein, a valve member supported by the bonnet for movement within the cavity to open and close the flowway, a pair of seat elements each having an opening therethrough, a pair of carriers in the cavity each mounting a seat element for engagement between a side of the valve member in its closed position and a surface on the body which surrounds the flowway adjacent its intersection with each side of the cavity, means responsive to movement of the valve member between opened and closed positions, respectively, for rotating each of the carriers in opposite directions, means for rotating the downstream seat element with the carrier in which it is mounted upon movement of the valve member into one of said positions and enabling it to be held against rotation therewith upon movement of the valve member into the other of said positions, and each of said carriers and seat elements being removable from the cavity of the body upon removal of the bonnet therefrom.

18. A valve, comprising a body having a flowway therethrough and a cavity therein intersecting the flowway and opening to one side of the body, a bonnet removably connected to the body to cover the cavity opening, a valve member supported by the bonnet for movement within the cavity to open and close the flowway, a seat element having an opening therethrough, and a rigid carrier in the cavity rigidly mounting the seat element against radial displacement with respect to the flowway during movement of the valve member, said carrier being held against radial movement by and between the bonnet and the closed end and opposite sides of the cavity whereby friction between the valve member and seat element will not move the seat element from its mounted position and it is located for engagement between the valve member in its closed position and a surface on the body which surrounds the flowway adjacent its intersection with one side of the cavity.

19. A valve, comprising a body having a flowway therethrough and a cavity therein intersecting the flowway and opening to one side of the body, a bonnet removably connected to the body to cover the cavity opening, a valve member supported by the body for movement within the cavity to open and close the flowway, a pair of seat elements each having an opening therethrough, and a pair of rigid carriers in the cavity each rigidly mounting a seat element against radial displacement with respect to the flowway during movement of the valve member on opposite sides of the valve member, said carriers being held against radial movement by and between the bonnet and the closed end and opposite sides of the cavity whereby friction between the valve member and seat elements will not move the seat elements from their mounted positions, and they are located for engagement between the valve member in its closed position and a surface on the body which surrounds the flowway adjacent its intersection with each side of the cavity.

20. A gate valve, comprising a body having a flowway therethrough and a cavity therein intersecting the flowway and opening to one side of the body, a bonnet removably connected to the body to cover the cavity opening, a gate having an opening therethrough and supported by the bonnet for reciprocation within the cavity to align and disalign the gate opening with the flowway for opening and closing the flowway, respectively, seat element means having opening means therethrough, and plate means mounted within the cavity supporting the seat element means adjacent the path of the gate therein to define two substantially confined chambers of variable capacity above and below the gate, and a groove connecting the chambers for circulating grease within said cavity from one chamber to the other during movement of the gate.

21. A gate valve, comprising a body having a flowway therethrough and a cavity therein intersecting the flowway and opening to one side of the body, a bonnet removably connected to the body to cover the cavity opening, a gate having an opening therethrough and supported by the bonnet for reciprocation within the cavity to align and disalign the gate opening with the flowway for opening and closing the flowway, respectively, a pair of seat elements each having an opening therethrough, a pair of plates mounted within the cavity each supporting a seat element adjacent opposite sides of the path of the gate therein so as to define two substantially confined chambers of variable capacity above and below the gate, and a groove connecting the chambers for circulating grease within said cavity from one chamber to the other during movement of the gate.

22. In a gate valve comprising a body having a flowway therethrough and a cavity therein intersecting the flowway and opening to one side of the body, a gate and seat assembly replaceably disposable within the cavity and through the side opening in the body, said assembly comprising a gate, a pair of plates each having a port therethrough and disposed on opposite sides of the gate, a pair of annular seat elements each having an opening therethrough and carried within a plate port for engagement with opposite sides of the gate in the closed position thereof and to align the openings in the seat element with the flowway, said gate being movable between said plates to open and close the openings through the seat elements, and parts on each of said plates engageable by parts on the gate toward the end of its opening and closing movements, respectively, to rotate each plate in opposite directions about the axis of the opening through the seat element carried thereby, each plate port being split at one side for flexure between positions tightly receiving its seat element and permitting removal of said seat element therefrom.

23. In a gate valve comprising a body having a flowway therethrough and a cavity therein intersecting the flowway and opening to one side of the body, a gate and seat assembly replaceably disposable within the cavity and through the side opening in the body, said assembly comprising a gate including a paddle and a nut connected to one edge thereof, a pair of plates each having a port therethrough and disposed on opposite sides of the paddle, a pair of annular seat elements each having an opening therethrough and tightly fitted within a plate port for engagement with opposite sides of the paddle in the closed position thereof and to align the openings in the seat element with the flowway, said nut being connectable to a stem for moving said paddle between said plates to open and close the openings through the seat elements, and parts on each of said plates engageable by shoulders on the nut toward the end of its opening and closing movement, respectively, to rotate each plate in opposite directions about the axis of the opening through the seat element carried thereby.

24. In a gate valve having a replaceable gate and seat assembly of the character defined in claim 23, wherein the width of the nut is substantially equal to the combined widths of the paddle and plates.

25. In a gate valve having a replaceable gate and seat assembly of the character defined in claim 23, wherein said paddle is provided with an opening therethrough for registering with the openings through the seat elements in the open position of the gate, and said paddle and nut are releasably connected to one another in a manner to insure disposal of said opening in its proper position.

26. A replaceable gate and seat assembly, comprising a gate, a pair of plates each having a port therethrough and disposed on opposite sides of the gate, a pair of annular seat elements each carried within a plate port for engagement with opposite sides of the gate, said gate being movable between said plates to open and close the openings through the seat elements, and parts on each of said plates engageable by shoulders on the gate toward the end of its opening and closing movement, respectively, to rotate each plate in opposite directions about the axis of the opening through the seat element carried thereby, and a dog pivotally connected to each plate for swinging movement into frictional engagement with the seat element carried thereby during rotation of said plate in one of said directions.

27. A replaceable gate and seat assembly of the character defined in claim 26, wherein said parts on the plates comprise pins extending therebetween and mounting the dogs for said pivotal movement.

28. A replaceable gate and seat assembly of the character defined in claim 26, wherein said seat elements are thicker than the plates in which they are carried and each dog is engageable with the periphery of the seat element which projects outwardly from the plate in which it is carried.

29. A replaceable gate and seat assembly of the character defined in claim 28, including spring means holding the inner sides of the plates against opposite sides of the gate.

30. In a rotary plug type valve comprising a body having a flowway therethrough and a cavity therein intersecting the flowway and opening to one side of the body, a rotary plug and seat assembly replaceably disposable within the cavity through the side opening, said assembly comprising a plug having an opening therethrough, a pair of carriers each having a port therethrough and disposed on opposite sides of the plug, a pair of annular seat elements each having an opening therethrough and carried within a carrier port for engagement with opposite sides of the plug, said plug being rotatable between said carriers to align and disalign its opening with the openings through the seat elements, parts on each of said carriers engageable by shoulders on the plug toward the end of its opening and closing movement, respectively, to rotate each carrier in opposite directions about the axis of the opening through the seat element carried thereby, and a dog pivotally connected to each carrier for swinging movement into frictional engagement with the seat element carried thereby during rotation of said plate in one of said directions.

31. In a rotary type plug valve having a replaceable rotary plug and seat assembly of the character defined in claim 30, wherein said carrier parts comprise oppositely facing surfaces on said dog.

32. In a rotary type plug valve having a replaceable rotary plug and seat assembly of the character defined in claim 30, wherein the inner sides of the carriers are shaped to fit the plug and guide it during rotation therebetween.

33. A valve, comprising a body having a flowway therethrough and a cavity therein intersecting the flowway, a valve member mounted on the body for movement within the cavity to open and close the flowway, a seat element having an opening therein and carried within the body with its opening forming a continuation of the flowway therethrough for rotation about its opening and for seating in a plurality of rotational positions between the valve member in its closed position and a surface on the body, and means responsive to movement of the valve member between opened and closed positions for rotating the seat element from one predetermined rotational seating position to a different predetermined rotational seating position than said one position to thereby distribute wear about the seat element.

34. A valve, comprising a body having a flowway therethrough and a cavity therein intersecting the flowway, a valve member mounted on the body for movement within the cavity to open and close the flowway, a seat element having an opening therethrough, a carrier in the cavity mounting the seat element with its opening forming a continuation of the flowway therethrough for rotation therein about its opening and for seating in a plurality of rotational positions between the valve member in its closed position and a surface on the body, and means responsive to movement of the valve member between opened and closed positions for rotating the seat element from one predetermined rotational seating position to a different predetermined rotational seating position than said one position to thereby distribute wear about the seat element.

35. A valve, comprising a body having a flowway therethrough and a cavity therein intersecting the flowway and opening to one side of the body, a bonnet removably connected to the body for covering the opening from the cavity therein, a valve member supported by the bonnet for movement within the cavity to open and close the flowway, a seat element having an opening therethrough, a carrier in the cavity mounting the seat element with its opening forming a continuation of the flowway therethrough for rotation therein about its opening and for seating in a plurality of rotational positions between the valve member in its closed position and a surface on the body, means responsive to movement of the valve member between opened and closed positions for rotating the seat element from one predetermined rotational seating position to a different predetermined rotational seating position than said one position to thereby distribute wear about the seat element, and both said carrier and seat element being removable from the cavity of the body upon removal of the bonnet therefrom.

36. A valve of the character defined in claim 35, wherein the carrier is held between the bonnet and walls of the cavity by engagement therewith.

37. A gate valve, comprising a body having a flowway therethrough and a cavity therein intersecting the flowway and opening to one side of the body, a bonnet removably connected to the body to cover the cavity opening, a gate having an opening therethrough and supported by the bonnet for reciprocation within the cavity to align and disalign the gate opening with the flowway for opening and closing the flowway, respectively, seat element means having opening means therethrough, plate means mounted within the cavity supporting the seat element means adjacent the path of the gate therein to define two substantially confined chambers of variable capacity above and below the gate, and a groove in the gate connecting the chambers for circulating grease within said cavity from one chamber to the other during movement of the gate.

38. A valve, comprising a body having a flowway therethrough, a valve member for opening and closing the flowway, operating means for moving the valve member between opened and closed positions, a seat element having an opening therein and carried within the valve body with its opening forming a continuation of the flowway therethrough for seating between the valve member in its closed position and the body, and means responsive to actuation of the operating means for rotating the seat element from one predetermined seating position to a different predetermined seating position than said one position to thereby distribute wear about the seat element.

39. A valve of the character defined in claim 38, wherein a surface on the valve member is moved transversely across the opening in the seat upon opening and closing.

40. A valve of the character defined in claim 39, wherein the valve member is a gate.

41. A valve of the character defined in claim 39, wherein the valve member has a substantially spherical surface with which the seat element is engageable in the closed position of the valve member.

42. A valve, comprising a body having a flowway therethrough, a valve member mounted on the body for movement between positions opening and closing the flowway, means for moving the valve member between opened and closed positions, a seat element having an opening therein and carried within the body with its opening forming a continuation of the flowway therethrough for rotation about its opening, said seat element seating, in a plurality of rotational positions, between the body about the flowway and the valve member in its closed position, and means responsive to actuation of said moving means for rotating said seat element from one predetermined seating position to a different predetermined seating position than said one position to thereby distribute wear about the seat element.

43. A valve of the character defined in claim 42, wherein said seat element is rotatable between such positions entirely about its opening.

44. A valve of the character defined in claim 42, wherein said seat element is moved between predetermined seating positions in one directional sense about its opening.

45. A valve, comprising a body having a flowway therethrough and a cavity therein intersecting the flowway, a valve member mounted on the body for movement within the cavity to open and close the flowway, a seat element having an opening therein and carried within the body with the opening forming a continuation of the flowway therethrough for rotation about its opening in seating engagement between the body and the valve member in its closed position, and means for rotating the seat element from one predetermined seating position to a different predetermined seating position than said one seating position to thereby distribute wear about the seat element in response to movement of the valve member and while the flowway is substantially open.

46. A valve of the character defined in claim 45, wherein said rotating means includes parts on the valve member operable to impart rotation to the seat element toward the end of its opening movement and inoperable to impart such rotating during its closing movement.

47. A valve of the character defined in claim 45, including a carrier within the cavity mounting the seat element.

References Cited in the file of this patent
UNITED STATES PATENTS

| | | |
|---|---|---|
| 1,770,900 | Dawson | July 22, 1930 |
| 2,192,339 | Wilson | Mar. 5, 1940 |
| 2,230,600 | Olson | Feb. 4, 1941 |
| 2,310,583 | Johnson | Feb. 9, 1943 |
| 2,767,730 | Laird | Oct. 23, 1956 |
| 2,854,209 | Erwin | Sept. 30, 1958 |

FOREIGN PATENTS

| | | |
|---|---|---|
| 629,628 | Germany | July 19, 1934 |